March 9, 1948. A. B. DONKERSLEY ET AL Re. 22,980

SPRING HANGER

Original Filed June 9, 1944

Albert B. Donkersley
James R. Welshman
Inventors:
by Harry Dexter Peck
Attorney

Reissued Mar. 9, 1948

Re. 22,980

UNITED STATES PATENT OFFICE 22,980

SPRING HANGER

Albert B. Donkersley and James R. Welshman, Cranston, R. I., assignors to Grinnell Corporation, Providence, R. I., a corporation of Delaware Original No. 2,397,094, dated March 26, 1946, Serial No. 539,579, June 9, 1944. Application for reissue November 8, 1947, Serial No. 784,922

2 Claims. (Cl. 248—54)

This invention relates to improvements in spring hangers. More especially it has to do with the provision of a simple, rugged hanger, using only a single direct-acting spring, which can be installed in a vertical space heretofore deemed insufficient for available hangers having like sensitivity and load supporting ability.

Spring hangers are desirably employed where a known load supported by the hangers is subject to a moderate range of movement which can be foretold with reasonable certainty. Probably the greatest need for such hangers is for the support of a pipe line which conducts fluid whose temperature may vary and cause movement of certain of the pipes in the system. Most such systems comprise vertical risers at one place or another from which horizontal pipe lines extend. It is the expansion or contraction of the risers which causes the vertical displacement of the horizontal pipes, the magnitude of the movement being in proportion to the length of the risers. If this displacement is large, say from one to four inches, the horizontal pipes should be supported by what is known in the trade as a constant-support hanger. When the displacement is not over an inch the cost of a constant-support hanger seems not justified and yet the problem of properly supporting the horizontal pipe lines is nevertheless pressing.

The importance of providing proper support for pipe systems carrying steam is appreciated when the pressures and temperatures involved are realized. In power plants the present day pressures frequently are as high as 2000 pounds per square inch and the temperature of the steam is around 960° F. Under such conditions even a small local failure would be disastrous to personnel because, aside from the high pressure behind a leak, the escaping steam is at a temperature sufficient to impart a dull red color to the metal of the pipe. Moreover, the performance of the metals now used in pipe lines and valves subjected to such high pressures and temperatures cannot be definitely forecast. The conditions are relatively new and there is no long background of experience upon which to predicate a sound estimate for the future. However, it has already been determined that carbon molybdenum steel—which is the material now most commonly used—is gradually being weakened and rendered brittle by a process of graphitization. This is especially so in regions adjacent to welds, a serious fact when it is realized that welding is almost exclusively employed in the fabrication and installation of such pipe lines.

Pipe lines are seldom, if ever, of uniform weight per unit of length. Besides the different sizes of pipes used in a line there are usually fittings and valves at various locations, and occasionally a bend may be provided to absorb what would otherwise be a horizontal displacement of the line. Thus to provide proper support a hanger should be particularly adapted for the precise portion of the total weight of the line which the hanger is to carry. An ideal condition would be to design a hanger for its individual load, but this is economically prohibitive. Hence in practice a spring hanger should be designed to be used with a restricted range of loads and to so limit the working range of the spring that any load within the load range can be supported with safety to the pipe line.

All this emphasizes the need for properly supporting pipe lines which carry fluids at high pressures and temperature and which are subject to vertical displacements. Throughout the movement of the pipe the load does not appreciably change in weight—unless the fluid by chance changes from the liquid to the gaseous state or vice versa—but the piping may shift its position to an extent that would make the use of a fixed hanger undesirable if not actually dangerous. Since the load does not change in weight during its contemplated movements, and since the lifting effect of a direct-acting spring does vary in accordance with its deflection, it is most desirable that a spring of such characteristics be used that its supporting effect on the load be not extensively changed throughout the range of movement.

The desired sensitivity in a spring hanger ordinarily presupposes a hanger long enough in vertical extent to permit the spring to be extended its free length when the load is not being supported. This requires hangers of such vertical dimension as to be incapable of installation in many places where the space between a load and an overhead fixed support is limited. If in such a limited space a single spring hanger of the kind heretofore available on the market is installed, it means that to save space a spring having a large spring characteristic must be employed with consequent sacrifice of sensitivity. Indeed, this very fact usually rules out the use of the ordinary spring hanger because the setup of a piping system, for example, is generally such that the consequent changes in the lifting force of the spring throughout even a small range of movement of the load are prohibitive, in that unsafe stresses and reactive forces would be imposed upon either the piping itself or the fittings or apparatus to which it is connected.

With the foregoing in mind, the primary object of the present invention is to provide a hanger, having just a single direct-acting spring, which can be installed in a relatively small vertical space and which will nevertheless have a desired sensitivity and avoid extreme changes in the lifting force of the spring throughout the movement of the load. We have found that by pre-loading or pre-compressing a spring of desired sensitivity during the assembly of the hanger, and by designedly shaping and arranging certain parts of the hanger so as to utilize some of the space within the spring, a hanger of such over-all size can be provided that it can be used in places where heretofore the space available was deemed too small for hangers of the customary construction. More specifically, by employing a dished or recessed plate at the lower end of the hanger casing and another such plate for engagement with the spring appreciable vertical space is saved. And it is a feature of the spring plate that its edge is so shaped and disposed as to serve as the indicator for a suitable scale or scales provided on the outside of the hanger. One such scale has graduations indicating the extent of movement of the spring plate when carrying loads as indicated on the load range scale. Obviously such a marked saving in over-all vertical length means a corresponding saving in the amount and weight of material going into the make-up of a hanger and, what is more important, now makes it possible to employ direct-acting single spring hangers in places where space limitations prohibited the installation of such hangers as were heretofore on the market.

The best mode in which we have contemplated applying the principles of our improvements is shown in the accompanying drawing, but these are to be deemed merely illustrative for it is intended that the patent shall cover by suitable expression in the appended claims whatever features of patentable novelty exist in the invention disclosed.

Figure 2:
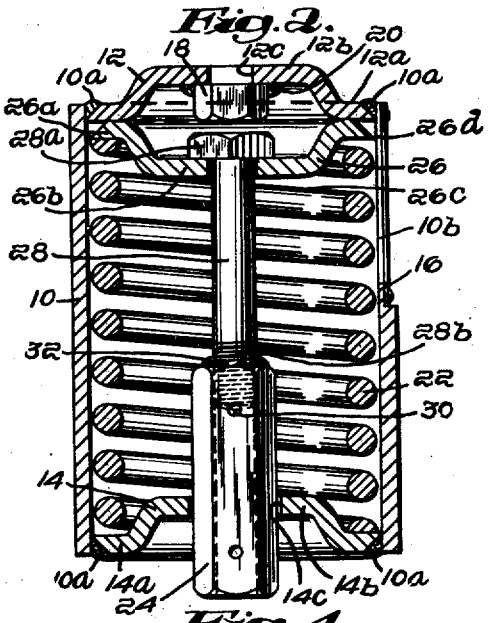
Figure 2 is a like medial vertical section, taken as on line 2—2 of Figure 4, showing the parts fully assembled.

Referring to the drawing, and more particularly to Figure 2 for the moment, the hanger comprises a casing having a cylindrical shell 10 and a pair of end plates 12 and 14. Each of the latter has a rim 12a, 14a which is secured to the shell within the plane of the edge thereof, preferably by welding as indicated at 10a.

On one side of the shell, in the upper part thereof, is an opening 10b so arranged that a flat scale plate 16 may be attached to the shell overlying the said opening. If a metal or other opaque scale plate is used a vertically disposed slot 16a (see Fig. 4) will be provided therein, but such a slot is not necessary if the scale plate is made of transparent material. On the plate may be provided a scale with graduations 16b indicating the weight of the load being supported and another scale 16c have graduations representing the deflection or distance the load may move. The former scale, showing the load range, does not begin with a zero graduation but with one indicating the minimum load which the hanger is intended to support, and the scale ends with the maximum load to be yieldingly carried by the hanger. For example, if the hanger is adapted for supporting loads from 600 pounds to 850 pounds, the topmost graduation on the load scale will be marked 600 and the lowermost graduation will be marked 850. Between these end markings the scale is provided with intermediate graduations which preferably have a relation with the spring constant of the spring used in the hanger. If this constant is 150 pounds per inch of deflection of the spring, then the intermediate graduations would be 650, 700, and so on in 50 pound increments up to 850.

The upper end plate 12 could be a simple flat plate, as indicated in dotted outline in Fig. 2, to which suitable means could be attached for connecting the hanger with some overhead support, but where space permits we prefer to use a dished plate such as is shown in full lines. The dished portion 12b of such a plate upstands from the plane of the top edge of the shell and thus provides space within the dished portion for a nut 18 which is secured to the inner surface of the plate by being tack welded thereto as indicated at 20. The nut is placed around an axial hole 12c in the plate in order that the threaded end of a supporting rod or eye bolt (see Fig. 3) may be passed through the hole and screwed into the nut 18.

The lower plate 14 is designedly of dished or recessed shape, having its rim 14a secured to the shell within the lower edge thereof and with its dished portion 14b upstanding within the shell. This particular arrangement is preferred for two reasons. The dished portion serves as a centering guide for a spring 22 housed within the shell with its bottom resting on the rim 14a of the lower end plate, and the space within the dished portion is available to a wrench when applied to a tubular coupling member 24.

A movable dished spring plate 26 has its rim 26a resting on the spring 22 with its dished portion 26b downstanding within the spring. This arrangement provides a space for the head 28a of a hanger rod 28 whose shank extends downward through an axial hole 26c in the movable plate 26 and is provided with external threads 28b at its lower end. These are engaged by internal threads in the tubular coupling member 24 whose body normally extends downward through an axial hole 14c in the lower end plate and is provided with opposed flat surfaces suitable for engagement by a wrench.

Figure 1:
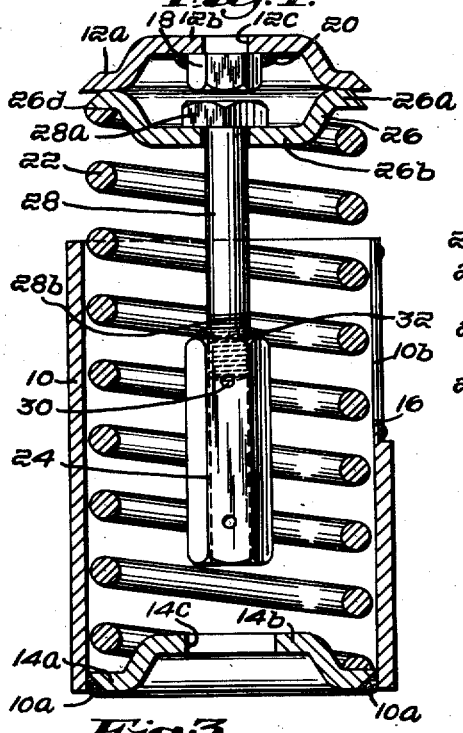
Figure 1 is a medial sectional view of the parts of a hanger embodying our improvements, showing their relation when the hanger is partly assembled.

In assembling the hanger, the bottom end plate 14 is welded into the shell and then the spring 22, standing at its free length, as seen in Figure 1, is inserted in the shell, its lower end being centered in the casing by the upstanding dished portion 14c of the lower plate. Prior to placing the spring plate 26 on the top of the spring, the shank of the hanger rod 28 will have been passed through the axial hole 26c and threaded into the coupling member 24. When the latter has progressed far enough along the shank for the end of the hanger rod to be seen in the peep hole 30, the rod and coupling member are secured together, preferably by tack welding as indicated at 32. Then the coupling member and hanger rod are inserted within the spring 22, until the plate 26 engages the top of the spring. The dished portion 26*b* of the plate, extending into the space within the spring, serves to center the plate with respect to the spring and thus bring the coupling member 24 into alignment with the axial hole 14*c* in the lower end plate of the shell. The top plate 12 is next applied to the spring plate, rim to rim, as shown in Figure 1, it being of course understood that prior to this the nut 18 has been secured to the underside of the top plate. The hanger parts are now ready for the pre-loading or pre-compressing of the spring.

Figure 3:
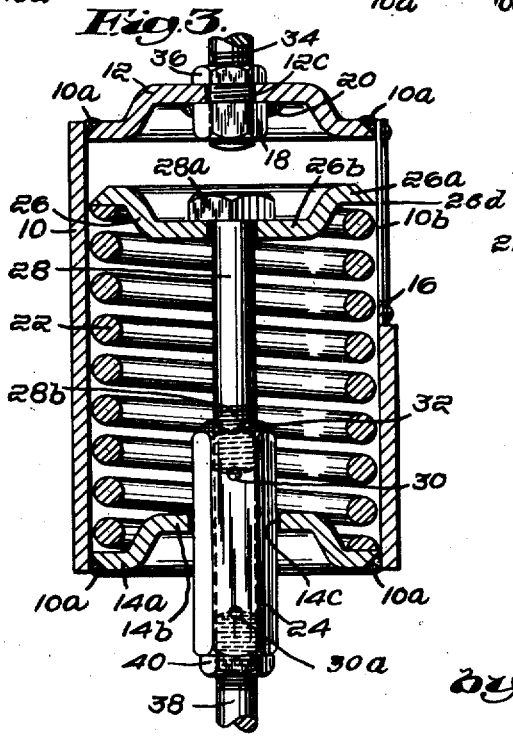
Figure 3 is another like sectional view showing the relation of parts when a load is being supported.

This step of pre-loading is readily accomplished by the use of a press which, acting on the top plate 12, forces this plate, the spring plate 26, hanger rod 28, and coupling member 24 downward, and at the same time compresses the spring 22. When the upper side of the rim 12*a* of the top plate is flush with the top edge of the shell 10, the plate and shell are welded together as shown in Figures 2 and 3. Upon removal of the hanger from the press the spring will be preloaded and exerting force on both end plates of the shell.

Actually the spring force is exerted upon the bottom plate and the movable plate between which plates the pre-compressed spring is confined, the latter plate being held at a limited distance from the bottom plate. This limited distance or inside height of the casing is the significant or effective height which controls the extent to which the spring is pre-compressed during the assembly of the hanger. By properly limiting this height of the casing between the bottom and movable plates the hanger cannot be used to yieldingly support a load which weighs less than the force exerted by the spring in its pre-compressed condition. To this end also there is no provision for adjustment of the spring force, thus insuring that once the hanger is fully assembled the spring will thereafter be under a permanent, non-adjustable pre-compression.

We have found that a highly satisfactory hanger is attained by pre-compressing the spring so that it has a pre-load of not less than three times its spring constant. For example, if the multiple is say 3.5, then with the hanger previously referred to as being adapted for a load range of from 600 to 850 pounds, using a spring having a spring constant of 150 pounds per inch of deflection, the spring would be pre-compressed to 525 pounds. This would be the force exerted by the spring on the movable plate 26 when the hanger is assembled as shown in Fig. 2. If any load of less than 525 pounds is applied to the hanger, no deflection of the spring will occur. Not until at least the minimum load of 600 pounds is being supported will the indicating edge 26*d* of the spring plate be opposite the uppermost graduation on the scale 16*a*. If a load in excess of 850 pounds is imposed on the hanger, then the spring will be compressed to a point where the indicating edge 26*d* will be below the lowermost graduation on the scale. Thus the scale laid out and marked for the range of loads the hanger is intended to support will prohibit the improper use of the hanger for loads outside of this predetermined range.

Of course any load less than the force exerted by the spring due to its pre-compression will be supported, but not yieldingly supported because it will cause no deflection of the spring, and likewise any load in excess of the maximum spring force will be supported, but not yieldingly supported because the spring will be deflected to its solid length. But in the designed load range of the hanger any load will be yieldingly supported with a predetermined variation in supporting effect. That is, if the hanger is one adapted for a load range of from 600 to 850 pounds, and the spring used has a constant of 150 pounds, then if the minimum load is being carried and it moves either upward or downward a half inch, the variation in supporting effect of the spring will be 75 pounds at the end of either half inch of movement. Likewise if the maximum load of 850 pounds is being carried by the hanger, then for the same assumed ½ inch of deflection, either up or down, the variation in the spring force will be 75 pounds. Thus a hanger embodying the present improvements will yieldingly support a known load with a predetermined variation in supporting effect during movement of the load within the intended load range of the hanger.

This variation is predetermined as a selected percentage of the minimum load so that throughout the load range this selected percentage will not be exceeded. In the instant example, with a minimum load of 600 and a variation of 75 pounds per half inch of deflection, the percentage would be 12½%. In order that this selected percentage may be the same for all hangers supporting a pipe line, the amount of pre-compression of the spring can be expressed as a multiple of the spring constant. Referring again to the hanger heretofore mentioned as an example, this multiple is found by dividing the pre-compressed load by the spring constant, that is 525÷150 gives a multiple of 3.5. If now another hanger on the pipe line must be adapted to support a minimum load of 1800 pounds, and the same percentage of variation in the supporting effect is to be maintained, then the necessary change in spring force is found by multiplying the minimum load by the desired percentage, namely $$1800 \times 12\tfrac{1}{2}\% = 225 \text{ pounds}$$

Since this change is for only a ½ inch deflection, it is multiplied by 2 to get the spring constant of 450 pounds per inch of deflection. Having thus arrived at the proper spring constant it need only be multiplied by the multiple 3.5 to determine the pre-compressed load to be imposed on the spring, thus $450 \times 3.5 = 1575$ pounds. Accordingly if all the springs in a group of hangers supporting a pipe line are chosen on the basis of their minimum load and the percentage variation desired, the pre-compressed load for each spring can be readily determined by using a common multiple arrived at as aforesaid. Having determined the proper pre-compression of the spring so that at the minimum load the percentage variation in supporting effect will be in keeping with good practice, it follows that for any greater load in the load range of the hanger this percentage variation will not be exceeded. This is because the spring constant remains constant even though the loads are larger, and therefore with such larger loads the percentage of variation in the supporting effect will actually be less than that with the minimum load.

Thus by pre-compressing springs in accordance with the improvements herein disclosed, a hanger of proper predetermined load range will be used for the load to be supported and upon thermal movement of the pipe line there will be imposed upon the pipe structure a substantially uniform percentage variation of supporting effect that may be pre-selected to come within the limits of safe engineering practice.

To install the hanger for supporting a load, a supporting rod 34 or eye bolt is passed through the axial hole 12c in the top plate and screwed into the nut 18. By turning the rod or eye bolt until its inner end makes contact with the head 28a of the hanger rod a full thread engagement with the nut 18 is assured. Thereupon a jam nut 36 is turned tightly against the top plate, locking the supporting rod or eye bolt and such top plate firmly together.

Figure 4:
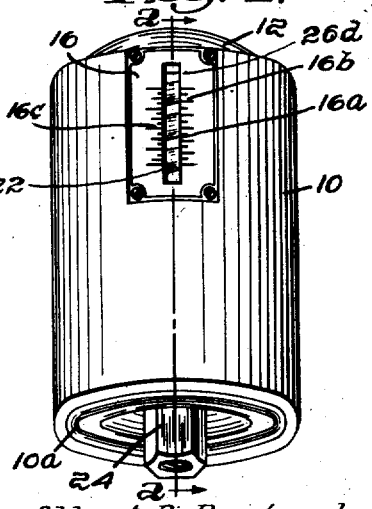
Figure 4 is a perspective of the improved hanger as shown in section in Figure 2.

The aforesaid contact of the supporting rod 34 with the head 28a of the hanger rod cannot only be felt, but such contact is actually indicated by the novel indicator of the hanger. The rim 26a of the spring plate is beveled to provide a sharp edge 26d which, as shown in Figs. 2, 3 and 4, lies close by the scale plate 16. If the workman watches this indicating edge while screwing the supporting rod 34 into the nut 18, he will observe a slight movement of the edge immediately contact is made and the spring plate starts to move. Indeed it is immaterial if the scale plate is moved downward slightly to abundantly assure a full thread engagement between the supporting rod 34 and the nut 18, because the beginning of the scales 16b and 16c with which the indicator cooperates is well below the place where such slight movement would bring the spring plate.

The installation of the hanger may be accomplished as follows. It may first be secured to some overhead support by means of the rod 34 as previously described. Then another tie rod 38, which is connected with the load, is applied to the lower end of the coupling member 24. If this lower tie rod is rotatable, it can be turned into the coupling member but if the rod 38 is held non-rotatable about its axis a wrench is applied to the coupling member 24 to turn the latter along the non-rotating tie rod, preferably far enough for the end of the rod to be seen through the peep hole 30a. As the coupling member turns so does the hanger rod 28, and possibly the spring plate 26. This is immaterial because the indicating edge 26d extends all around the plate and is always visible regardless of how the plate may be rotated.

It is desirable that the hanger be adjusted so that when the load is in its normal position, the spring will be compressed to an extent that will bring the indicating edge 26d somewhere in the vicinity of the load mark on the scales. Thus setting of the indicator may be accomplished when the load is in its normal position and being carried by the hanger. Usually the load is a pipe which may move between what is called its "hot" position and its "cold" position. If the extent of this movement is known, and it usually is, then the hanger can be adjusted at either position. If the pipe moves upward a known amount when heated, then the setting of the hanger when the pipe is cold is with the indicating edge 26d the said known distance below the eventual normal hot position. If the pipe on the other hand moves downward from its cold to its normally hot position, then the hanger may be initially set with the indicating edge the known distance above the eventual normal position of the pipe. Such adjustment of the hanger is accomplished by means of the coupling member 24, or by means of the tie rod 38, or both, depending upon whether or not the lower tie rod is susceptible of rotation when connected with the load. When the adjustment is complete the coupling member 24 and lower tie rod 38 are locked together by another jam nut 40, and the hanger will thereafter support the load yieldingly and permit movements of the load which may ordinarily occur.

By pre-loading or pre-compressing the spring, and by employing the dished or recessed plates at both ends of the spring, and arranging their dished portions as described, the over-all vertical dimension of the hanger is kept reasonably small, and enables a spring of the desired sensitivity to be used. Because of all this the improved hanger can now be employed in installations where heretofore, although spring supports were desirable, the available space prohibited the use of such hangers as have been on the market.

We claim:

1. A spring hanger for supporting a known load with a predetermined variation in supporting effect during movement of the load within a limited range, said hanger comprising a casing having plates secured to its top and bottom ends, a movable plate within the casing, a hanger rod engaging said movable plate and extending downward through the bottom end plate for connection with the load to be supported, and a spring confined within said casing between the bottom plate thereof and the movable plate; said spring having a free length greater than the height of said casing and having a spring constant corresponding to the said predetermined variation and being pre-compressed so as to limit its working range to one in which the spring force exerted while yieldingly supporting the load is not less than a selected multiple of the spring constant.

2. A spring hanger for supporting a portion of a piping system having a substantially constant weight and being subject to movement within a limited range due to changes in temperature of the system, said hanger having a casing and a plate relatively movable with respect to one another, and a pre-compressed spring confined between said plate and a part of the said casing and connected with the said portion of the piping system for supporting said portion with a predetermined variation in supporting effect during movement of said portion within said limited range; the said spring having a free length greater than the distance between said movable plate and the said part of the casing when the hanger is fully assembled and not supporting any load, having a spring constant corresponding to the said predetermined variation in supporting effect, and being placed under a permanent, non-adjustable pre-compression during assembly of the hanger so as to limit its working range to one in which the force exerted by the spring while yieldingly supporting the said portion of the piping system is not less than a selected multiple of the spring constant.

ALBERT B. DONKERSLEY.
JAMES R. WELSHMAN.